United States Patent
Devroe et al.

(10) Patent No.: US 11,602,100 B2
(45) Date of Patent: Mar. 14, 2023

(54) AGRICULTURAL BALER

(71) Applicant: CNH Industrial America LLC, New Holland, PA (US)

(72) Inventors: Jeroen Devroe, Zegem (BE); Dries Liefooghe, Alveringem (BE); Dieter Kindt, Vladslo (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 635 days.

(21) Appl. No.: 16/701,807

(22) Filed: Dec. 3, 2019

(65) Prior Publication Data

US 2020/0170192 A1    Jun. 4, 2020

(30) Foreign Application Priority Data

Dec. 3, 2018   (EP) ..................................... 18209816

(51) Int. Cl.
  *A01F 15/10*   (2006.01)
  *A01F 15/04*   (2006.01)

(52) U.S. Cl.
  CPC .......... *A01F 15/101* (2013.01); *A01F 15/046* (2013.01); *A01F 2015/102* (2013.01)

(58) Field of Classification Search
  CPC . A01F 15/101; A01F 15/046; A01F 2015/102
  See application file for complete search history.

(56) References Cited

U.S. PATENT DOCUMENTS

| | | | | |
|---|---|---|---|---|
| 5,092,114 A | * | 3/1992 | Eggenmueller | A01F 15/04 56/343 |
| 2014/0318391 A1 | * | 10/2014 | Verhaeghe | A01F 15/04 100/138 |

FOREIGN PATENT DOCUMENTS

| | | |
|---|---|---|
| DE | 4219719 C1 | 7/1993 |
| EP | 0276496 A1 | 8/1988 |
| WO | 2013/072473 A1 | 5/2013 |
| WO | 2017/068060 A1 | 4/2017 |
| WO | WO-2017068058 A1 * | 4/2017 ........... A01F 15/101 |

OTHER PUBLICATIONS

Extended European Search Report for EP Application No. 18209816.0 dated Jun. 7, 2019 (seven pages).

* cited by examiner

*Primary Examiner* — Adam J Eiseman
*Assistant Examiner* — Mohammed S. Alawadi
(74) *Attorney, Agent, or Firm* — Peter Zacharias; Patrick Sheldrake

(57) ABSTRACT

An agricultural baler includes a bale chamber for the compression of crop material into bales. The bale chamber has a floor that comprises an inlet opening. The baler also has a plunger for forcing the crop material from an inlet end of the bale chamber towards an outlet end, and a feeder duct communicating with the bale chamber through the inlet opening. The feeder duct has an upper end facing generally upwardly and communicating with the inlet opening in the bale chamber and a lower end facing generally in a forward direction. The feeder duct also has a top wall and a bottom wall extending between the lower end and the upper end of the feeder duct. The baler also has one or more actuators that are configured to move the top wall and/or the bottom wall; and a controller configured to activate the one or more actuators during a baling operation in order to adjust the volume of the feeder duct.

19 Claims, 6 Drawing Sheets

AGRICULTURAL BALER

FIELD OF THE INVENTION

The present invention relates to agricultural balers, and more specifically to rectangular balers, that is, balers that produce bales of crop material that are rectangular in side view, and to a method relating to the operation of such a baler.

SUMMARY OF THE INVENTION

According to a first embodiment of the invention there is provided an agricultural baler, comprising:

a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct;

one or more actuators that are configured to move the top wall and/or the bottom wall; and a controller configured to activate the one or more actuators during a baling operation in order to adjust the volume of the feeder duct.

Using such a controller and an actuator to move the top and/or bottom walls of the feeder duct can enable sophisticated operation of the baler during a baling operation in terms of improved efficiency and/or quality of bales.

The controller may be configured to activate the one or more actuators at one or more instants in time during an operational cycle of the baler.

The baler may further comprise a stuffer means operable to convey crop material from the feeder duct through the inlet opening and into the bale chamber. The controller may be configured to activate the one or more actuators at one or more predetermined instants in time during a stuffer cycle of the stuffer means.

The stuffer means may comprise stuffer-tines that are movable from a stuffer-tine-start-position at the lower end of the feeder duct to a stuffer-tine-end-position at the upper end of the feeder duct. The stuffer cycle may comprise movement of the stuffer-tines from the stuffer-tine-start-position to the stuffer-tine-end-position, along the feeder duct, in order to convey crop material from the feeder duct through the inlet opening and into the bale chamber.

The controller may be configured to activate the one or more actuators to increase the volume of the feeder duct at a release-instant-in-time. The release-instant-in-time may be immediately before movement of the stuffer-tines from the stuffer-tine-start-position to the stuffer-tine-end-position.

At the release-instant-in-time, the controller may be configured to activate the one or more actuators to move the top wall and the bottom wall further apart from each other at the upper end of the feeder duct.

The controller may be configured to activate the one or more actuators to decrease the volume of the feeder duct at a compress-instant-in-time. The compress-instant-in-time may be immediately before the release-instant-in-time.

At the compress-instant-in-time, the controller may be configured to activate the one or more actuators to move the top wall and the bottom wall closer together at the upper end of the feeder duct.

The controller may be configured to activate the one or more actuators to define a feeder duct that has a variable cross-sectional area along its length in between stuffer cycles.

The controller may be configured to activate the one or more actuators to define a feeder duct having a funnel-configuration which has at least a portion of decreasing cross-sectional area from the lower end to the upper end, in between stuffer cycles.

The controller may be configured to activate the one or more actuators to define a feeder duct having a parallel-configuration that has a substantially consistent cross-sectional area from the lower end to the upper end, in between stuffer cycles and after the feeder duct has been controlled to have a funnel-configuration.

The controller may be configured to activate the one or more actuators to define a feeder duct having a reverse-funnel-configuration, for which at least a portion of the feeder duct has an increasing cross-sectional area in a direction from the lower end to the upper end of the feeder duct, at an instant in time that is a predetermined period of time from an end of the stuffer cycle at which stuffer-tines are at a stuffer-tine-end-position.

The baler may further comprise: a feeder means operable to convey crop material from the lower end of the feeder duct toward the upper end. The controller may be configured to activate the one or more actuators at one or more predetermined instants in time during a feeder cycle of the feeder means.

The feeder means may comprise feeder-tines that are movable from a feeder-tine-start-position at the lower end of the feeder duct along the feeder duct towards a feeder-tine-end-position. The feeder cycle may comprise movement of the feeder-tines from the feeder-start-position towards the feeder-tine-end-position, in order to compress crop material in the feeder duct.

The controller may be configured to activate the one or more actuators at one or more predetermined instants in time during a plunger cycle of the plunger.

The plunger cycle may comprise movement of the plunger from: (i) a retracted position, in which the plunger is at the inlet end of the bale chamber; to (ii) an extended position, in which the plunger is closer to the outlet end of the bale chamber.

The controller may be configured to activate the one or more actuators to increase the volume of the feeder duct at a release-instant-in-time. The release-instant-in-time may be immediately before the plunger moves from the retracted position towards the extended position.

The controller may be configured to activate the one or more actuators to decrease the volume of the feeder duct at a compress-instant-in-time. The compress-instant-in-time may be immediately before the release-instant-in-time.

There may be provided a method for operating an agricultural baler, the baler comprising:

a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct;

one or more actuators that are configured to move the top wall and/or the bottom wall; and wherein the method comprises:

activating the one or more actuators during a baling operation in order to adjust the volume of the feeder duct.

There may be provided an agricultural baler, comprising:

a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;

a plunger for forcing the crop material from the inlet end of the bale chamber towards the outlet end of the bale chamber;

a feeder duct communicating with the bale chamber through the inlet opening for charges of crop material to be transferred from the feeder duct into the bale chamber, wherein the feeder duct has an upper end facing generally upwardly and communicating with the inlet opening in the bale chamber and a lower end facing generally in a forward direction, the feeder duct has a top wall and a bottom wall extending between the lower end and the upper end of the feeder duct; and one or more actuators that are configured to move the top wall and/or the bottom wall during a baling operation in order to adjust the volume of the feeder duct.

The one or more actuators may be one or more mechanical actuators. The one or more actuators may be configured to provide the feeder-duct with a funnel-configuration and/or a reverse-funnel-configuration.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
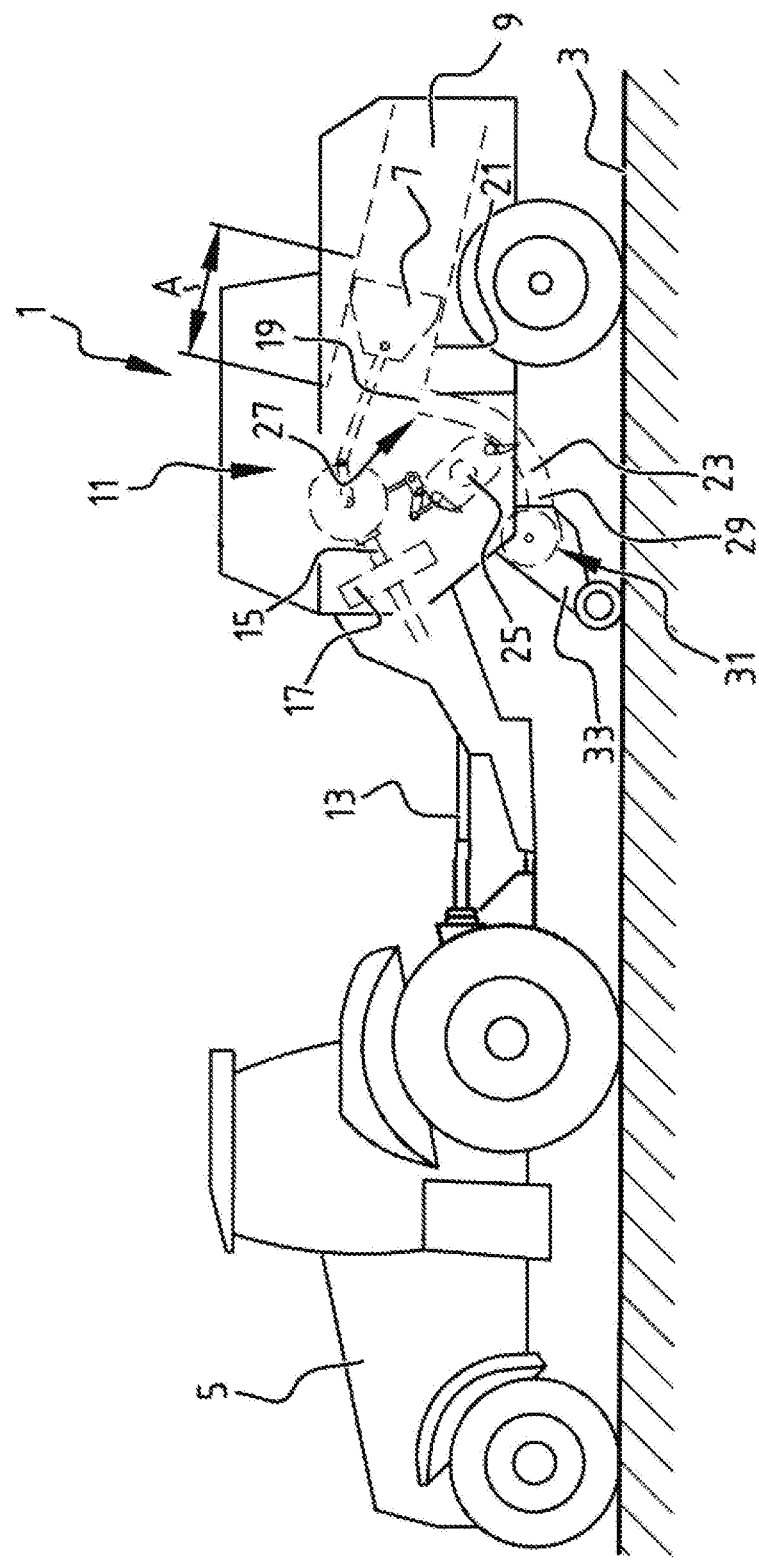
FIG. 1 shows a rectangular agricultural baler.

FIG. 1 shows a rectangular agricultural baler 1. The baler 1 can be moved forward over a ground surface 3 by means of a tractor 5.

The baler 1 has a bale chamber 9, in which crop material is compressed into bales. The bale chamber 9 has a floor, a ceiling, a first wall and a second wall. A bale forming direction of the bale chamber 9 extends from an inlet end to an outlet end of the bale chamber 9. The baler 1 is provided with a plunger 7 that during operation is moved reciprocally along a linear path A in the bale chamber 9 by means of a crank mechanism 11 connected to the plunger 7. In this way, the plunger 7 forces the crop material from the inlet end of the bale chamber towards the outlet end of the bale chamber. A plunger cycle includes movement of the plunger 7 from: (i) a retracted position, in which the plunger 7 is at the inlet end of the bale chamber 7; to (ii) an extended position, in which the plunger 7 is closer to the outlet end of the bale chamber 9.

The crank mechanism 11 is connected for driving via a drive shaft 13 to the motor of the tractor 5. The tractor 5 is provided for this purpose with a power take-off device, also referred to as PTO. The drive shaft 13 connects an output shaft of the PTO of the tractor 5 to an input shaft 15 of the crank mechanism 11. A flywheel 17 is arranged on the input shaft of the crank mechanism.

A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 can also be referred to as a pre-compression chamber (PCC) because it defines a volume in which the crop material is compressed before being moved into the bale chamber 9.

The feeder duct 23 has an upper end 27 facing generally upwardly and communicating with the inlet opening 19 in the bale chamber 9, and a lower end 29 facing generally in a forward direction and communicating with a cutting unit 31. The cutting unit 31 is arranged for cutting crop material supplied by a pick-up device 33 and to convey the cut crop material into the feeder duct 23. In other examples, the cutting unit 31 can be replaced by a packing unit that does not cut the crop.

Figure 2:
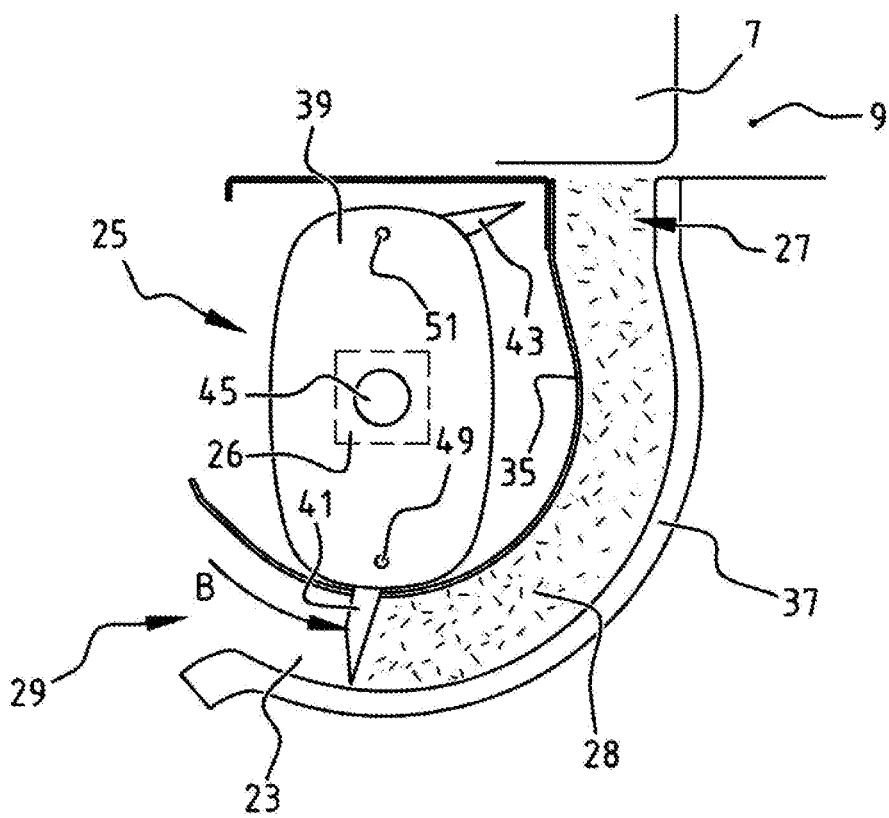
FIGS. 2 and 3 show the feeder duct during normal operation, in more detail.
Figure 3:
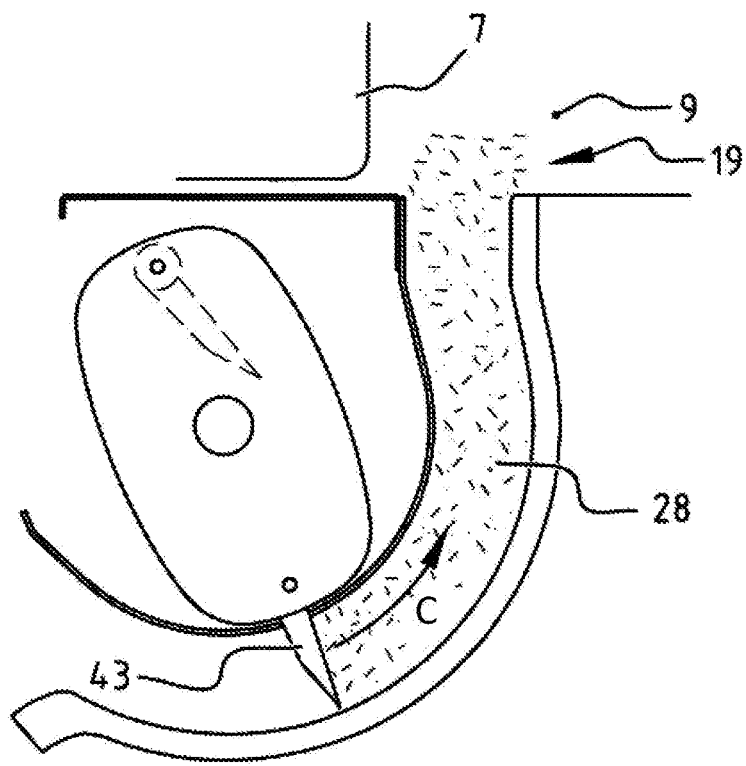

FIGS. 2 and 3 show the feeder duct 23 during normal operation, in more detail. The feeder duct 23 is defined between a feeder duct top wall 35 and feeder duct bottom wall 37. The top wall 35 and the bottom wall 37 extend between the lower end 29 and the upper end 27 of the feeder duct 23. The feeder duct top wall 35 provides an upper boundary for the feeder duct 23. The feeder duct bottom wall 37 provides a lower boundary for the feeder duct 23. Feeder means 25 are operable in the feeder duct 23. The feeder means 25 include a rotatable drum 39 having sets of tines 41, 43 arranged thereon. In operation, the drum 39 is rotated in the direction of arrow B about an axis of rotation 45.

The feeder means 25 further include a schematically shown drive 26. The drive 26 is arranged for rotating the drum 39 in the direction of arrow B about axis of rotation 45. The drive 26 further includes a mechanism for rotating the respective sets of tines 41, 43 relative to the drum 39 about a respective axis of rotation 49, 51, while the drum 39 is rotated in the direction of arrow B about its axis of rotation 45. This causes the outer ends of the tines 41, 43 to be moved along a path of movement. This path of movement may be a fixed path of movement or an adjustable path of movement, wherein the drive 26 comprises a mechanism for adjusting the path of movement of the sets of tines 41, 43, while the drum 39 is rotated in the direction of arrow B about axis of rotation 45.

During normal operation, the outer ends of the tines 41, 43 are caused to be moved along a path of movement through the feeder duct 23 in the direction indicated by arrow C, thereby conveying cut crop material that has been conveyed by the cutting unit 31 (shown in FIG. 1) into the lower end 29 of the feeder duct 23, from the lower end 29 of the feeder duct 23 toward the upper end 27 thereof.

As illustrated by means of FIG. 2, the feeder means 25 first accumulate a charge of crop material 28 in the feeder duct 23.

As illustrated by means of FIG. 3, once the charge of crop material 28 has been accumulated, and the plunger 7 has cleared the inlet opening 19 of the bale chamber 9, the outer ends of the tines 43 are caused to be moved along a path of movement through the feeder duct 23 in the direction indicated by arrow C, thereby stuffing, i.e. conveying, the accumulated charge of crop material 28 through the opening 19 into the bale chamber 9.

It will be appreciated that different mechanisms can be used for accumulating the charge of crop material 28 in the feeder duct 23, and for stuffing/conveying, the accumulated charge of crop material 28 through the opening 19 into the bale chamber 9.

In this example, a single drum 39 has tines 41, 43 that are movable so that they can provide the functionality of both a feeder means (for compressing crop material in the feeder duct 23) and a stuffer means (for conveying crop material from the feeder duct 23 through the inlet opening 19 and into the bale chamber 9).

When the drum 39 and tines 41, 43 are operating as a stuffer means, the tines 41, 43 can be considered as stuffer-tines that are movable from a stuffer-tine-start-position at the lower end 29 of the feeder duct 23 to a stuffer-tine-end-position at the upper end 27 of the feeder duct 23. A stuffer cycle includes movement of the tines 41, 43 from the stuffer-tine-start-position to the stuffer-tine-end-position, along the feeder duct 23, in order to convey crop material from the feeder duct 23 through the inlet opening 19 and into the bale chamber 9. In this example, the tines 41, 43 are moved from the stuffer-tine-end-position back to the stuffer-tine-start-position, along a path that is outside of the feeder duct 23, in between stuffer cycles. In this way, the tines 41, 43 can be reset for the next stuffing cycle.

When the drum 39 and tines 41, 43 are operating as a feeder means, the tines 41, 43 can be considered as feeder-tines that are movable from a feeder-tine-start-position at the lower end 29 of the feeder duct 23 along the feeder duct 23 towards a feeder-tine-end-position. For such a feeder stroke (which may also be referred to as a packer stroke), the feeder means does not empty the feeder duct 23. Therefore, the feeder-tine-end-position is not necessarily at the end of the feeder duct 23; it can be at a predetermined position along the length of the feeder duct 23 (such as half way), or the feeder-tine-end-position can be at a variable position along the length of the feeder duct 23 (for example it can be dynamically set such that it varies with time or with density of crops, as non-limiting examples). A feeder cycle comprises movement of the tines 41, 43 from the feeder-start-position towards the feeder-tine-end-position, in order to compress crop material in the feeder duct 23.

Each of the above cycles are examples of an operational cycle of the baler.

Figure 4:
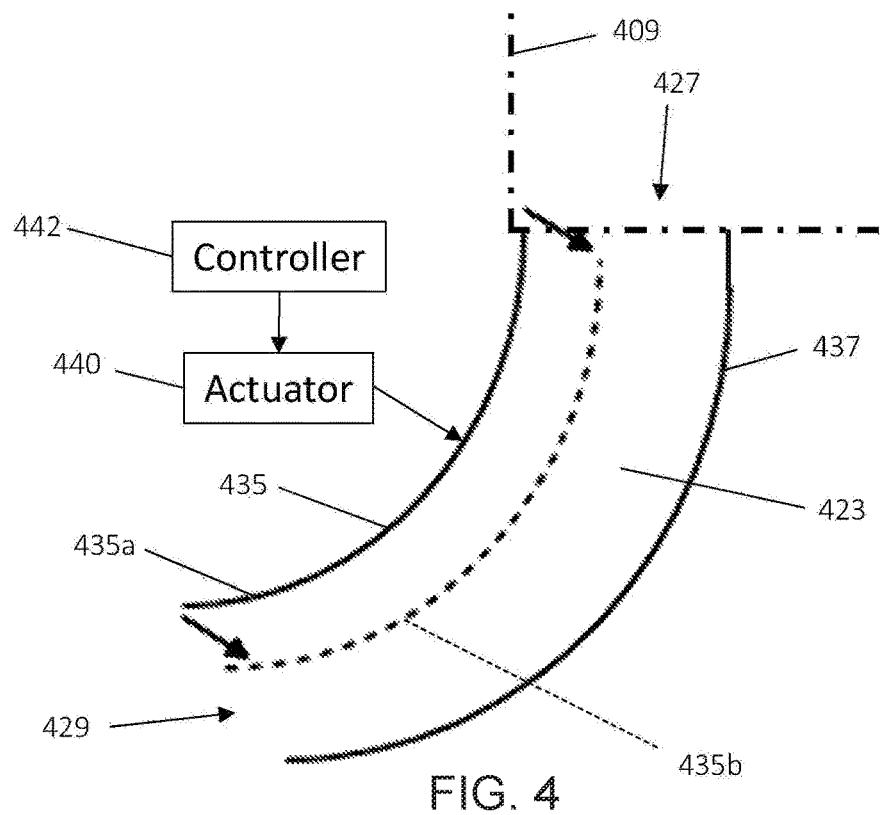
FIG. 4 shows part of an example embodiment of an agricultural baler, such as the baler illustrated in FIG. 1.

FIG. 4 shows part of an example embodiment of an agricultural baler, such as the baler illustrated in FIG. 1. FIG. 4 shows a feeder duct 423, a bale chamber 409, an actuator 440 and a controller 442. The feeder duct 423 has a top wall 435 and a bottom wall 437. In this example, the top wall 435 is movable between a first position 435a and a second position 435b (shown with a dashed line in FIG. 4). In the first position 435a, the top wall 435 is further away from the bottom wall 437 than it in the second position 435b. It will be appreciated that the top wall 435 can be positioned at any one of a plurality of positions, and that the first and second positions 435a, 435b are just two examples of different positions in which the top wall 435 can be located. The bottom wall 437 in this example is in a fixed position, for example fixed relative to the chassis of the baler. As will be discussed in more detail below, using a controller 442 and an actuator 440 to move one or more walls 425, 427 of the feeder duct 423 can enable sophisticated operation of the baler during a baling operation in terms of improved efficiency and/or quality of bales.

The actuator 440 can move the top wall 435. As non-limiting examples, the actuator can be provided as hydraulic cylinder(s), pneumatic cylinder(s), electric actuator(s), electro-hydraulic actuator(s).

The controller 442 is configured to activate the actuator 440 during a baling operation to set its position as either the first position 435a, the second position 435b, or any other position that is available. In this way, the controller 442 can adjust the volume of the feeder duct 423. As shown in FIG. 4, the controller 442 can activate the actuator 440 to move the top wall 435 and the bottom wall 437 further apart from each other, or closer together. In this example, the top wall 435 is moved such that it remains generally parallel with the bottom wall 437. In this way, the feeder duct 423 has a parallel-configuration that has a substantially consistent cross-sectional area from the lower end 429 to the upper end 427 of the feeder duct 423, irrespective of the position of the top wall 435. This can be advantageous because it can enable a smooth flow of crop through the feeder duct, and also the feeder duct can be set such that a predetermined relationship between the number of plunger cycles per stuffer cycle is achieved. For example, in some applications a 1:1 ratio may be advantageous because a good degree of compression of the crop can be achieved. Also, by avoiding one or more unused plunger cycles (in that there is no slice of crop to be compacted into the bale in the bale chamber, it can be less likely that the feeder duct will be overfilled which can lead to crop spillage and/or a blockage of the feeder duct.

As a further advantage, when the position of a wall is controlled by an actuator, the actuator can maintain the wall in a constant position when no crop is entering the feeder duct. This can enable the baler to have improved operation when it starts collecting a new windrow after having turned in a headland.

As a yet further advantage, the density of the crop in the feeder duct can be determined by monitoring the forces applied by the actuators on the movable walls. For example, a pressure feedback from a hydraulic actuator can be used to determine a force applied by a crop in the feeder duct. As will be discussed in detail below, the monitored force can then be used to control the baler.

It will be appreciated that one or more mechanical linkages can be connected to the top wall 435 to ensure that it moves in the way shown in FIG. 4.

Figure 5:
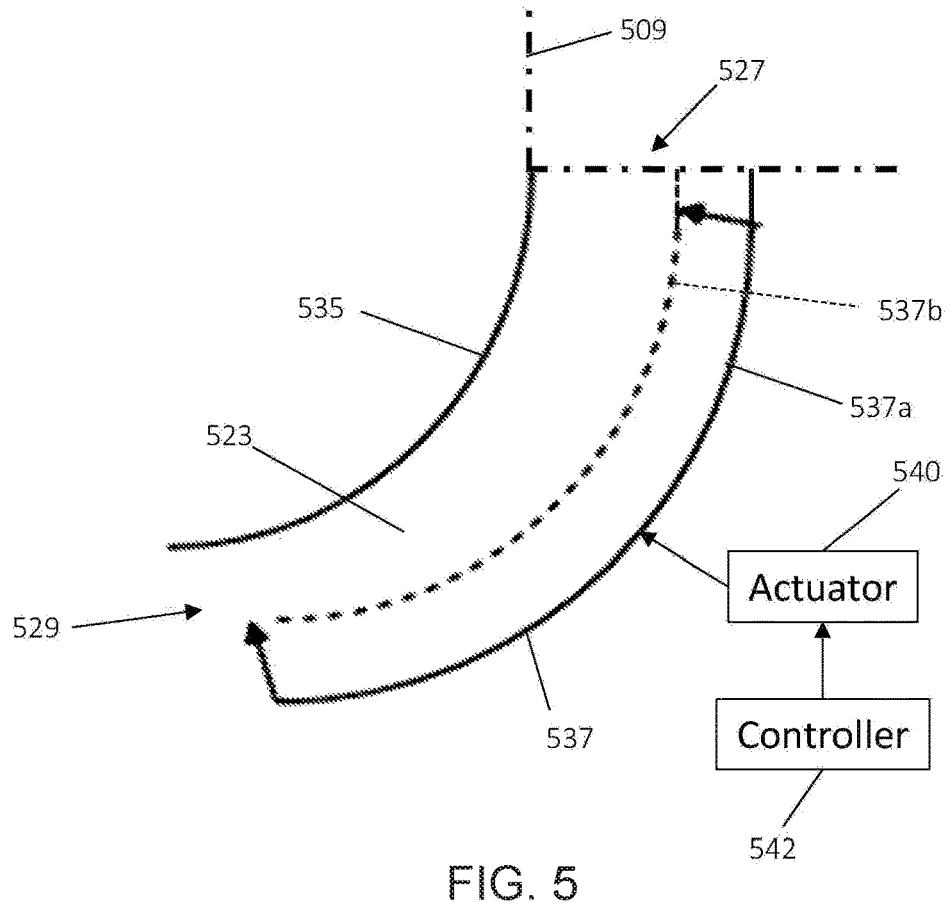
FIG. 5 shows part of an example embodiment of an agricultural baler, that is similar to FIG. 4.

FIG. 5 shows part of an example embodiment of an agricultural baler, that is similar to FIG. 4. Components of FIG. 5 that are also shown in FIG. 4 have been given corresponding reference numbers in the 500 series, and will not necessarily be described again here.

In this example, the bottom wall 537 is movable between a first position 537a and a second position 537b (shown with a dashed line in FIG. 5). In the first position 537a, the bottom wall 537 is further away from the top wall 535 than it is in the second position 537b. As above, the bottom wall 537 can be positioned at any one of a plurality of positions.

It will be appreciated that in other examples, not shown, the functionality of FIGS. 4 and 5 can be combined. In this way, either or both of the top wall 535 and the bottom wall 537 can be movable, whilst retaining a generally parallel-configuration. The baler may include one or more actuators 540 for moving the top wall 535 and the bottom wall 537—for example, a single actuator 540 can be used to move both walls 535, 537; or a separate actuator 540 can be used for each wall 535, 537. In some embodiments, the top wall 535 and bottom wall 537 can be moved in dependence on each other—for example, if the top wall 535 is moved outwards (away from the bottom wall 537), then the bottom wall 537 is also moved outwards (away from the top wall 535); similarly, if the top wall 535 is moved inwards (towards the bottom wall 537), then the bottom wall 537 is also moved inwards (towards the top wall 535). For instance, if the actuators are provided as cylinders, then the cylinders can be linked (up and down) with each other so that if one is going in, the other is going out and vice versa. In some embodiments, the top wall 535 and the bottom wall 537 can be moved independently of each other.

Figure 6:
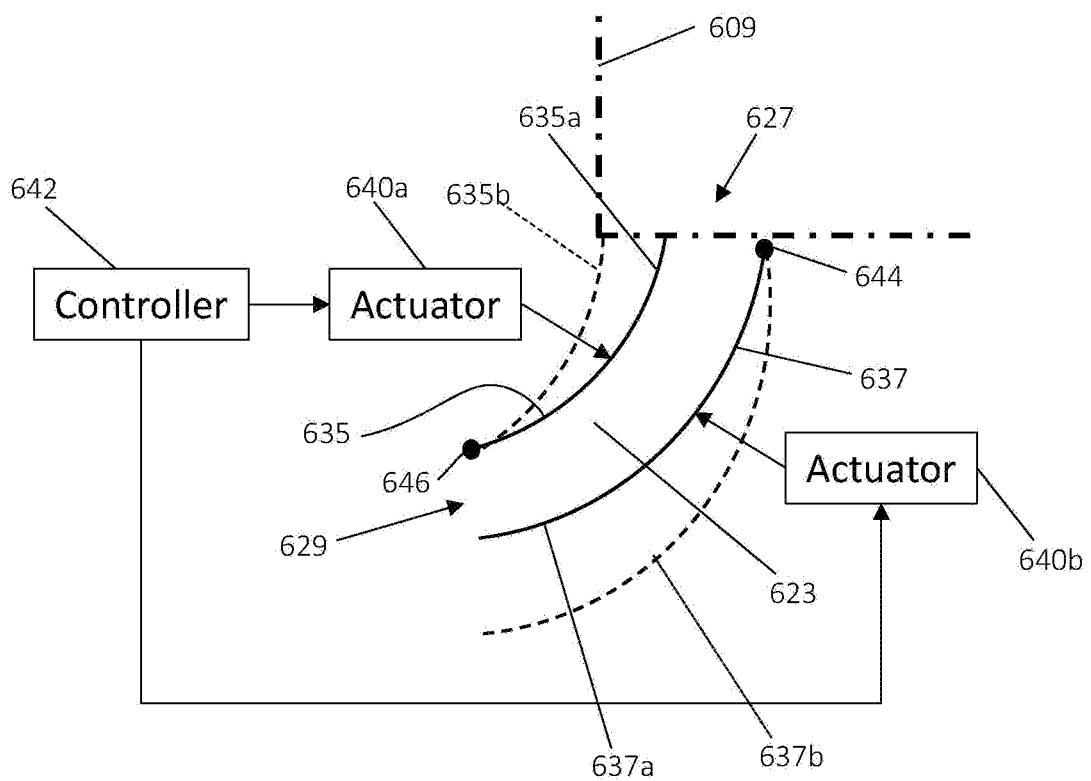
FIG. 6 shows part of another example embodiment of an agricultural baler, such as the baler illustrated in FIG. 1.

FIG. 6 shows part of another example embodiment of an agricultural baler, such as the baler illustrated in FIG. 1. FIG. 6 shows a feeder duct 623, a bale chamber 609, two actuators 640 and a controller 642. The feeder duct 623 includes a top wall 635 and a bottom wall 637.

In this example, the top wall 635 is movable about a pivot between a first position 635a and a second position 635b (shown with a dashed line in FIG. 6). The pivot is provided by a top-wall-hinge 646 in this example, which is at the lower end 629 of the feeder duct. The lower end of the top wall 635, about which the wall pivots, can therefore remain stationary. In the first position 635a, the top wall 635 is further away from the bottom wall 637 than it is in the second position 635b. However, due to the pivot provided by the top-wall-hinge 646 (assuming that the bottom wall 637 remains stationary), a distal portion of the top wall 635 moves further way from the bottom wall 637 than a proximal portion of the top wall 635. The terms "distal" and "proximal" are relative to the pivot provided by the top-wall-hinge 646. In this example the distal portion of the top wall 635 is at the upper end 627 of the feeder duct, and the proximal portion of the top wall 635 is at the lower end 629 of the feeder duct.

The bottom wall 637 is also movable about a pivot between a first position 637a and a second position 637b (shown with a dashed line in FIG. 6). In other examples, only one of the top wall 635 and bottom wall 637 may be movable, and the other one may be fixed. The pivot is provided by a bottom-wall-hinge 644 in this example, which is at the upper end 627 of the feeder duct 623. The upper end of the bottom wall 637 therefore remains stationary. In the first position 637a, the bottom wall 637 is further away from the top wall 635 than it is when it is in the second position 637b. However, due to the pivot provided by the bottom-wall-hinge 644 (assuming that the top wall 635 remains stationary), a distal portion of the bottom wall 637 moves further way from the top wall 635 than a proximal portion of the bottom wall 637. The terms "distal" and proximal" are relative to the pivot provided by the bottom-wall-hinge 644. In this example the distal portion of the bottom wall 637 is at the lower end 629 of the feeder duct, and the proximal portion of the bottom wall 637 is at the upper end 627 of the feeder duct.

In this example, the top-wall-hinge 646 and the bottom-wall-hinge 644 are provided at opposite ends of the feeder duct 623. In this way, the top and bottom walls 635, 637 can both be moved towards each other, or away from each other, in order to maintain a generally parallel-configuration if they are moved by corresponding amounts. Alternatively, one or both of the top and bottom walls 635, 637 can be moved by different amounts to define a feeder duct 623 that has a variable cross-sectional area along its length from the lower end 629 to the upper end 627. In another example, the top-wall-hinge and the bottom-wall-hinge may be provided at the same ends of the feeder duct 623.

As above, it will be appreciated that the top wall 635 and the bottom wall 637 can be positioned at any one of a plurality of positions, and that they may be moved in correspondence with each other or independently.

Figure 7:
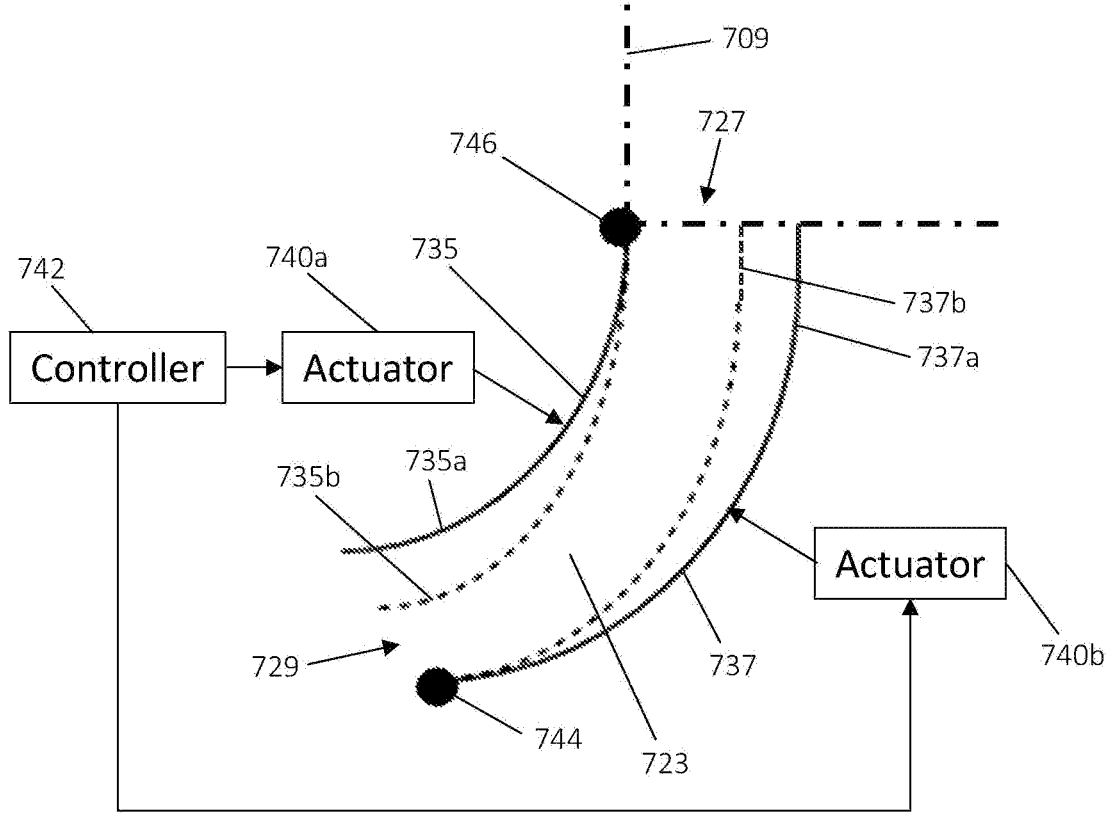
FIG. 7 shows part of a further example embodiment of an agricultural baler, which is similar to FIG. 6.

FIG. 7 shows part of a further example embodiment of an agricultural baler, which is similar to FIG. 6. Components of FIG. 7 that are also shown in FIG. 6 have been given corresponding reference numbers in the 700 series, and will not necessarily be described again here.

In this example the top wall 735 is pivotable about a top-wall-hinge 746, which is at the upper end 727 of the feeder duct 723. The upper end of the top wall 735 therefore remains stationary. The bottom wall 737 is pivotable about a bottom-wall-hinge 744, which is at the lower end 729 of the feeder duct 723. The lower end of the bottom wall 737 therefore remains stationary.

Figure 8:
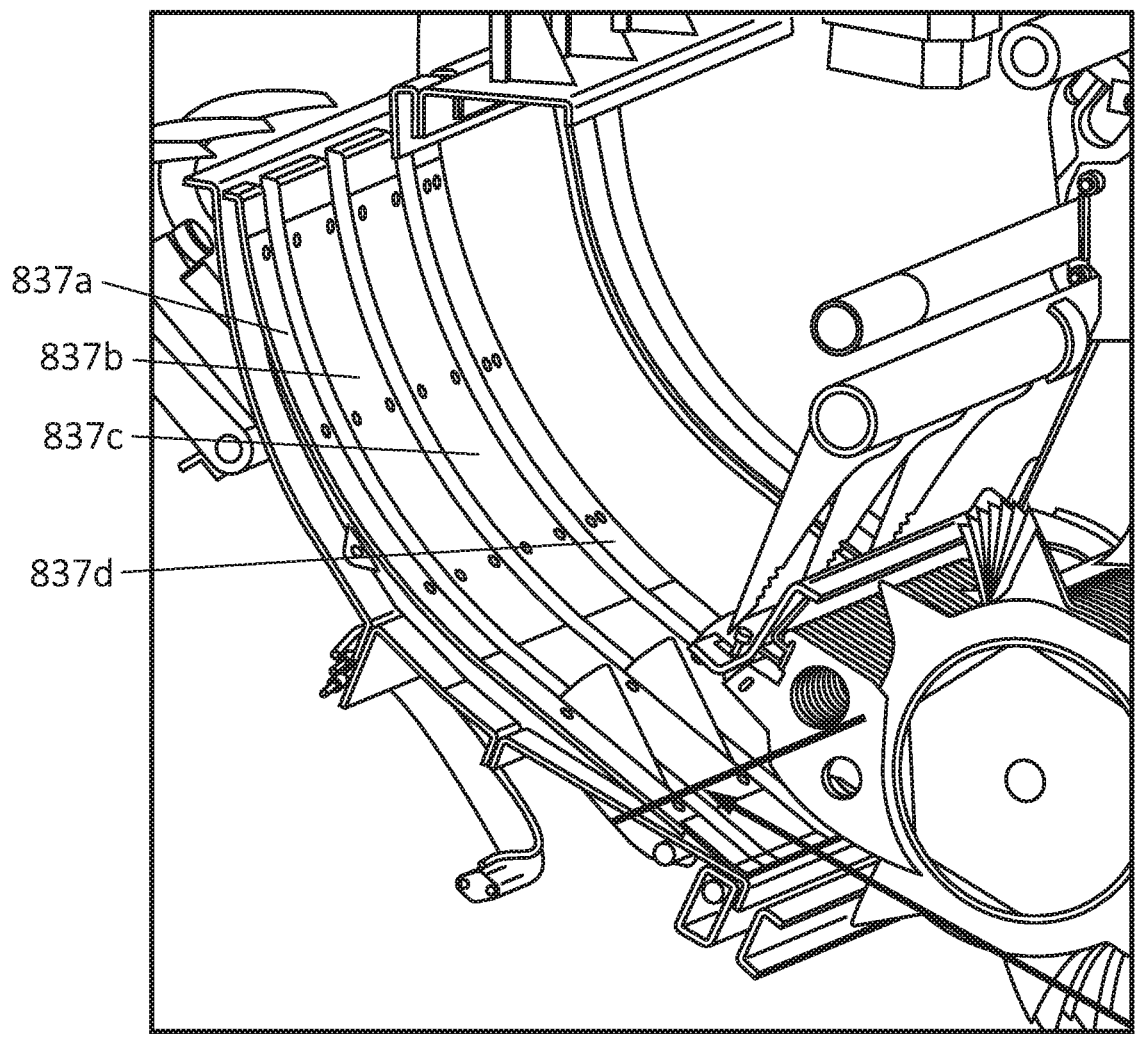
FIG. 8 shows part of another example embodiment of an agricultural baler.

FIG. 8 shows part of another example embodiment of an agricultural baler. In FIG. 8, the bottom wall is provided as a plurality of laterally spaced apart panels 837a-d—four of which are shown in FIG. 8. In some examples there are gaps between the spaced apart panels 837a-d, as shown in FIG. 8, so that a component such as a tine can access the feeder duct from the outside.

In other examples, the laterally spaced apart panels 837a-d may be contiguous portions of a continuous wall, wherein the contiguous portions are separately movable towards or away from the opposing wall. In such examples, a contiguous portion may be joined to a neighbouring portion by an elastic material to maintain the continuity of the wall when the portions are not co-linear with each other.

The laterally spaced apart panels can include one or more inner panels and one or more outer panels. The inner panels are located towards a lateral centre of the feeder duct. The outer panels are located towards a lateral extremity of the feeder duct.

In such examples, one or more actuators may be associated with one or more subsets of the laterally spaced apart panels. In this way, the controller can adjust the cross-sectional shape of the feeder duct. The controller can activate any such actuators in any of the ways described herein. For instance, the controller could move one or more of the inner panels more than one or more of the outer panels, such that the compression is higher in the centre (or it is more difficult for the crop to enter in the centre and it will be diverted more to the sides of the feeder duct).

In some examples, the gaps between the spaced apart panels 837a-d can be occupied by insert-panels (not shown). That is, a top and/or bottom wall can also include insert-panels in the spaces between a plurality of laterally spaced apart panels. The insert-panels may extend along the entire length of the feeder duct, or only a portion of the feeder duct. One or more actuators may be associated with the insert-panels. This may be instead of or in addition to one or more actuators that are associated with the spaced apart panels 837a-d. In this way, the controller can optionally move the insert-panels independently of the spaced apart panels 837a-d. This can be considered as moving parts in/through the wall, instead of moving the full wall, such that the insert-panels can be pushed in or out the feeder duct with an actuator. With such a setup, more strength can be provided in the shape of the feeder duct whilst still retaining an ability to reduce the volume. Optionally, any such insert-panels can be rotatable about a pivot as described above.

Various control mechanisms for one or more of the actuators/controllers will now be described. It will be appreciated that some of the actuators/controllers described herein can perform a plurality of the control mechanisms.

As discussed above, a stuffer means can be operable according to a stuffer cycle. In which case, the controller can activate one or more actuators at one or more predetermined instants in time during a stuffer cycle of the stuffer means. For example, the controller can activate the one or more actuators to increase the volume of the feeder duct at a release-instant-in-time. The release-instant-in-time can be immediately before movement of the stuffer-tines from the stuffer-tine-start-position to the stuffer-tine-end-position; for instance a predetermined period of time before the stuffer-tines leave the stuffer-tine-start-position. Such a predetermined period of time can be less than 0.05 s, 0.1 s, 0.2 s, 0.5 s, is or 2 s as non-limiting examples. In this way, the stuffer-tines can more easily transfer the crop from the feeder duct to the bale chamber because the friction applied to the crop slice by the top and bottom walls of the feeder duct can be reduced.

In some examples, at the release-instant-in-time, the controller can activate the one or more actuators to move the top wall and the bottom wall further apart from each other, at least at the upper end of the feeder duct. For example, the top and bottom walls can be moved to a position such that the feeder duct has a reverse-funnel-configuration. In a reverse-funnel-configuration, at least a portion of the feeder duct has an increasing cross-sectional area in a direction from the lower end to the upper end of the feeder duct. In other examples, the one or more actuators can move the entire top wall and the bottom wall further apart from each other at the release-instant-in-time, such that they generally remain parallel with each other.

Optionally, the controller can activate the one or more actuators to decrease the volume of the feeder duct at a compress-instant-in-time. The compress-instant-in-time can be immediately before (such as a predetermined period of time before) the release-instant-in-time, or a predetermined period of time before the stuffer-tines leave the stuffer-tine-start-position. Such a predetermined period of time can be less than 0.05 s, 0.1 s, 0.2 s, 0.5 s, is or 2 s as non-limiting examples. At the compress-instant-in-time, the controller can activate the one or more actuators to move the top wall and the bottom wall closer together, at least at the upper end of the feeder duct. In this way, the crop in the feeder duct can be further compressed (it can be given a squeeze) before it is moved out of the feeder duct and into the bale chamber. This can represent another way of making it easier for the stuffer-tines to reduce the friction applied to the crop slice by the top and bottom walls for the stuffer cycle. In other examples, the one or more actuators can move the entire top wall and the bottom wall closer together at the compress-instant-in-time, such that they generally remain parallel with each other.

The controller can activate the one or more actuators to define a feeder duct that has a variable cross-sectional area along its length in between stuffer cycles. For example, the controller can activate the one or more actuators to define a feeder duct having a funnel-configuration in between stuffer cycles. In a funnel-configuration, at least a portion of the feeder duct has a decreasing cross-sectional area from the lower end to the upper end of the feeder duct. This can to make it easier for the rotor/stuffer means to fill the feeder duct, especially the upper end of the feeder duct, in that the stuffer means may require lower rotor torques.

At least some of the examples disclosed herein, including use of a funnel-configuration, can result in an improved bale shape. For instance, by creating a funnel, the top space and top corners of the feeder duct can be better filled and with a higher density of crop material. This can be because the rotor will be able to fill it better. Therefore, the formed bale can have a much better shape. In some applications, a perfect shape of bale is: perfectly square in side/top/front view, perfectly straight and flat in all directions, and with very sharp corners (between surfaces and all 8 corners of the bale). Therefore, an ability to fill the corners of the feeder duct in an improved way can assist in obtaining an improved bale shape.

In some examples the controller can activate the one or more actuators to define a feeder duct having a parallel-configuration, that has a substantially consistent cross-sectional area from the lower end to the upper end, in between stuffer cycles and after the feeder duct has been controlled to have a funnel-configuration. In this way, the top and bottom walls can be made parallel with each after an initial funnel-configuration. This can enable consistent filling of the feeder duct after the upper end of the feeder duct has been filled during the funnel-configuration.

In some applications, the controller can activate the one or more actuators to define a feeder duct having a reverse-funnel-configuration at an instant in time that is a predetermined period of time from an end of the stuffer cycle. At the end of the stuffer cycle, the stuffer-tines are at the stuffer-tine-end-position. In a reverse-funnel-configuration, at least a portion of the feeder duct has an increasing cross-sectional area in a direction from the lower end to the upper end of the feeder duct. This can make it easier for the rotor/stuffer means to empty the feeder duct, in that the stuffer means may require lower rotor torques.

As discussed above, a feeder means can be operable according to a feeder cycle. In some examples, the controller can activate the one or more actuators at one or more predetermined instants in time during a feeder cycle of the feeder means. The actuators can be activated in any way described herein that assists with the feeding of crop material into the feeder duct, including to provide one or more of a reverse-funnel-configuration, a funnel-configuration or a parallel-configuration, either individually or in sequence, either during or in between feeder cycles.

As discussed above, a plunger can be operable according to a plunger cycle. In some examples, the controller can activate the one or more actuators at one or more predetermined instants in time during the plunger cycle. The controller can activate the one or more actuators to increase the volume of the feeder duct at a release-instant-in-time, wherein the release-instant-in-time is immediately before the plunger moves from the retracted position towards the extended position. Immediately before can be a predetermined period of time before the plunger moves from the retracted position towards the extended position. Such a predetermined period of time can be less than 0.05 s, 0.1 s, 0.2 s, 0.5 s, is or 2 s as non-limiting examples. In some applications, the controller can activate the one or more actuators to decrease the volume of the feeder duct at a compress-instant-in-time, wherein the compress-instant-in-time is immediately before the release-instant-in-time, or before the plunger moves from the retracted position towards the extended position.

In this way, the controller can activate one or more actuators at one or more instants in time during one or more of the operational cycles of the baler.

In some embodiments, instead of using an electronic controller and actuator as described above, the baler may include a mechanical actuator for moving the top wall and/or the bottom wall in any manner described herein. Such a mechanical actuator may be a spring-loaded mechanical coupling, a (timed) cam-lever system (optionally mechanically linked to the machine/plunger/stuffer or with an indirect actuator), or a cam shaft (also optionally mechanically linked to any component of the machine, or with an indirect actuator), for example. Such examples may be particularly useful when they can provide a feeder-duct with a funnel-configuration and/or a reverse-funnel-configuration.

In some examples, the controller can activate the one or more actuators based on a measured parameter during the baling operation. Such measured parameters can include one or more of:

tractor speed. For example, if the tractor speed is changed, then more or less crop material is entering the machine. Therefore, the controller can activate the one or more actuators in order to actively adapt to the volume of the feeder duct based on the amount of crop material that is entering the feeder duct.

rotor torque. In some applications, the rotor torque can be limited with a clutch. If the rotor torque is increasing or too high, then the controller can activate the one or more actuators to increase the volume of the feeder duct. In this way, the rotor torque can be lowered. Also, this can reduce the likelihood that the clutch will cut-out the rotor rotation, which can result in the driver having to interrupt a baling operation. Also, if the rotor torque is too low or decreasing, this can be representative of the density of crop material in the feeder duct being too low, and the controller can decrease the volume of the feeder duct.

stuffer torque. In some applications, the stuffer torque can be limited with a shear-bolt. If the stuffer torque is too high, such that the shear-bolt is about to break, the controller can increase the volume of the feeder duct. This can reduce the likelihood of the shear-bolt breaking. If the stuffer torque is too low, then this can be representative of the density of crop material in the feeder duct being too low, and the controller can decrease the volume of the feeder duct.

plunger force. The controller can adjust the volume of the feeder duct based on the plunger force, for instance to provide a more efficient baling process. In some applications if a low plunger force is detected, then there can be advantages to reducing the volume of the feeder duct. In other applications if a low plunger force is detected, then there can be advantages to increasing the volume of the feeder duct. For instance, high plunger forces can occur when there is a large volume crop material in the baling chamber that requires compression. Also, high plunger forces can occur when there a lower volume of crop material in the baling chamber. This is because the crop material is not capable of being compressed very much; for instance due to high pre compression in the feeder duct and/or the physical limitations on how much a thin slice of crop material can be compressed. Particularly, for this example, the controller can determine how to activate the one or more actuators based on a combination of the plunger force and one or more other measured parameters—for instance to determine why a high plunger force is being detected.

top door height. The "top door" of a baler can also be referred to as the ceiling of the bale chamber. The top door height, at least in part, defines the bale shape and density. It can be advantageous for the volume of the feeder duct to be directly related to the top door height. Therefore, the controller can set the volume of the feeder duct as a function of the top door position/height.

crop type and moisture. For wet crops and specific types of crops, the friction between the crop material and a wall over which it passes (including a wall of the feeder duct) is higher. Therefore, there can be advantages for the volume/cross-section of the feeder duct to be larger for wet crops than it is for dry crops. Also, for voluminous crops, the feeder duct can be set so as to have a larger volume/cross-section PBC that for 'dead' crops.

bale shape. The controller can set the volume of the feeder duct based on bale shape.

crop pressure within feeder duct. The controller can adjust the volume of the feeder duct in order to maintain the crop pressure within a predetermined range of values. For instance, if the crop pressure is too low, then the volume can be reduced in order to increase the crop pressure; and if the crop pressure is too high, then the volume can be increased in order to reduce the crop pressure.

It will be appreciated that any reference to "close to", "before", "after", "high", "low", "increasing" or "decreasing", etc, can refer to the parameter in question (or a derivative of the parameter in question) being less than or greater than a threshold value, or between two threshold values, depending upon the context.

In some examples, the controller can activate the one or more actuators based on an instruction provided by an operator. For instance, there could be preset operational modes that an operator can choose between, which activate one or more of the control mechanisms described above. In this way, the operator can choose a preset operational mode to: reduce the wear on the machine; or the noise generated by the machine; or the comfort of driving, as non-limiting examples. Such preset modes can be comfort mode, eco mode, high density mode, etc. In some examples, the operator may be able to provide user input that is based on their experience to ensure that the controller takes what they consider to be appropriate action in relation to controlling the volume of the feeder duct. Also, the operator can provide input if the controller fails, or if the operator wants to manually take over.

In some examples, a door is provided that defines at least a portion of the bottom wall of the feeder duct. The door can be movable between: (i) a door-open-position, in which an opening in the bottom wall is provided; and (ii) a door-closed-position in which the opening is closed. The door will be in the door-closed-position during normal use such that the feeder duct can communicate the crop material to the bale chamber. If a blockage in the feeder duct occurs, then the baler can be stopped and the door can be moved to the door-open-position. An operator can then manually remove the blockage and clean out the feeder duct. The door can also be referred to as a drop floor.

In some applications, the door can be the same component as a part of the bottom wall that is configured to be moved by the one or more actuators in order to adjust the volume of the feeder duct, as described herein. In such applications, when a blockage occurs in the feeder duct, the controller can move the bottom wall to a door-open-position such that the blockage can be manually removed by an operator. Such a door-open-position may correspond to a most outward position of the bottom wall, under the operation of the one or more actuators.

In some examples, it can be advantageous for the cutting unit/drawer to be openable to increase the size of an opening that an operator can use to access the feeder duct to clear any blockages which are located closer to the cutting unit or the pick-up device. Providing an openable cutting unit/drawer can be advantageous because it can provide direct access to a region of the feeder duct that can be most likely to become blocked in some applications.

In other examples, the baler may have a packer unit instead of a cutting unit. When a packer unit is used, the cutting drawer described above may be replaced by a plate/drawer that does not have any knives.

Figure 9:
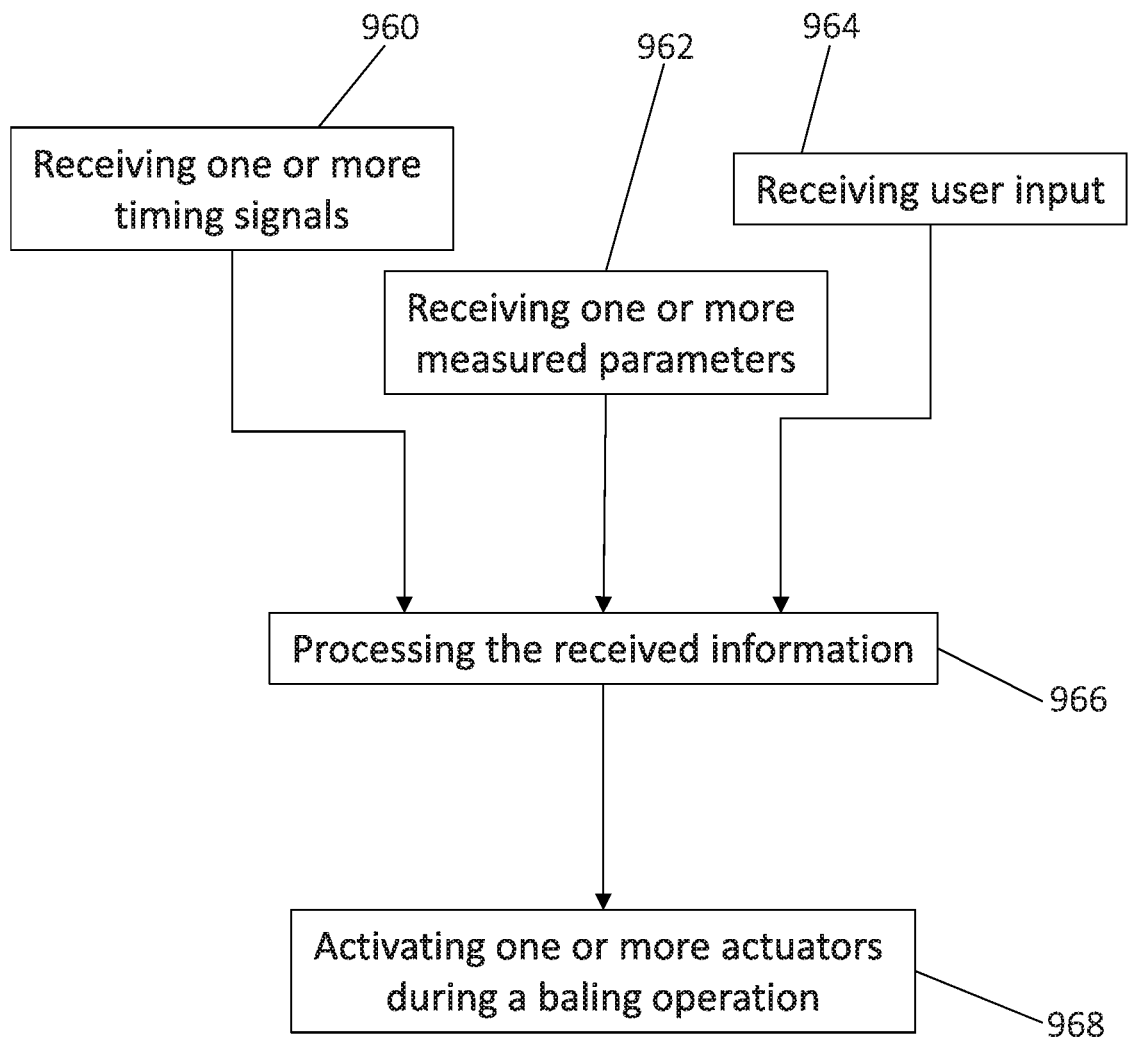
FIG. 9 shows schematically an example of a method for operating a baler.

FIG. 9 shows schematically an example of a method for operating an agricultural baler, such as the ones described herein.

The method in this example begins with one or more of the steps of: (i) receiving one or more timing signals (step 960), such as signals representative of an operation cycle of the baler; (ii) receiving one or more measured parameters (step 962), such as the various parameters that are described above; and (iii) receiving user input (step 964), such as selection of a preset operational mode as discussed above.

Then, at step 966, the method involves processing the received information, for instance in order to provide control signals for one or more actuators that are configured to move a top wall and/or a bottom wall of the feeder duct. At step 968, the method includes activating the one or more actuators during a baling operation in order to adjust the volume of the feeder duct.

The invention claimed is:

1. An agricultural baler, comprising:
a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;
a plunger for forcing the crop material from the inlet end of the bale chamber towards the outlet end of the bale chamber;
a feeder duct communicating with the bale chamber through the inlet opening for charges of crop material to be transferred from the feeder duct into the bale chamber, wherein the feeder duct has an upper end facing upwardly and communicating with the inlet opening in the bale chamber and a lower end facing in a forward direction, the feeder duct has a top wall and a bottom wall extending between the lower end and the upper end of the feeder duct;
one or more actuators that are configured to move the top wall and/or the bottom wall; and
a controller configured to activate the one or more actuators during a baling operation to adjust the volume of the feeder duct to at least three configurations, a selected one of the configurations being activated by the controller by moving at least one of the top wall and the bottom wall to create one of a funnel-configuration, a reverse-funnel-configuration and a parallel configuration between the top wall and the bottom wall as the actuators move the top wall and/or the bottom wall during the baling operation.

2. The agricultural baler of claim 1, wherein the controller is configured to activate the one or more actuators at one or more instants in time during an operational cycle of the baler.

3. The agricultural baler of claim 1, further comprising a stuffer operable to convey crop material from the feeder duct through the inlet opening and into the bale chamber, wherein the controller is configured to activate the one or more actuators at one or more predetermined instants in time during a stuffer cycle of the stuffer.

4. The agricultural baler of claim 3, wherein:
the stuffer comprises stuffer-tines that are movable from a stuffer-tine-start-position at the lower end of the feeder duct to a stuffer-tine-end-position at the upper end of the feeder duct; and
the stuffer cycle comprises movement of the stuffer-tines from the stuffer-tine-start-position to the stuffer-tine-end-position, along the feeder duct, in order to convey crop material from the feeder duct through the inlet opening and into the bale chamber.

5. The agricultural baler of claim 4, wherein the controller is configured to activate the one or more actuators to increase the volume of the feeder duct at a release-instant-in-time, wherein the release-instant-in-time is immediately before movement of the stuffer-tines from the stuffer-tine-start-position to the stuffer-tine-end-position.

6. The agricultural baler of claim 5, wherein, at the release-instant-in-time, the controller is configured to activate the one or more actuators to move the top wall and the bottom wall further apart from each other at the upper end of the feeder duct.

7. The agricultural baler of claim 5, wherein the controller is configured to activate the one or more actuators to decrease the volume of the feeder duct at a compress-instant-in-time, wherein the compress-instant-in-time is immediately before the release-instant-in-time.

8. The agricultural baler of claim 7, wherein, at the compress-instant-in-time, the controller is configured to activate the one or more actuators to move the top wall and the bottom wall closer together at the upper end of the feeder duct.

9. The agricultural baler of claim 3, wherein the controller is configured to activate the one or more actuators to define a feeder duct that has a variable cross-sectional area along its length in between stuffer cycles.

10. The agricultural baler of claim 9, wherein the controller is configured to activate the one or more actuators to define a feeder duct having a funnel-configuration which has at least a portion of decreasing cross-sectional area from the lower end to the upper end, in between stuffer cycles.

11. The agricultural baler of claim 9, wherein the reverse-funnel-configuration, for which at least a portion of the feeder duct has an increasing cross-sectional area in a direction from the lower end to the upper end of the feeder duct, at an instant in time that is a predetermined period of time from an end of the stuffer cycle at which stuffer-tines are at a stuffer-tine-end-position.

12. The agricultural baler of claim 1, wherein the parallel-configuration has a consistent cross-sectional area from the lower end to the upper end, in between stuffer cycles and after the feeder duct has been controlled to have a funnel-configuration.

13. The agricultural baler of claim 1, further comprising a feeder operable to convey crop material from the lower end of the feeder duct toward the upper end, wherein the controller is configured to activate the one or more actuators at one or more predetermined instants in time during a feeder cycle of the feeder.

14. The agricultural baler of claim 1, wherein the controller is configured to activate the one or more actuators at one or more predetermined instants in time during a plunger cycle of the plunger.

15. The agricultural baler of claim 14, wherein the plunger cycle comprises movement of the plunger from: (i) a retracted position, in which the plunger is at the inlet end of the bale chamber; to (ii) an extended position, in which the plunger is closer to the outlet end of the bale chamber.

16. The agricultural baler of claim 15, wherein the controller is configured to activate the one or more actuators to increase the volume of the feeder duct at a release-instant-in-time, wherein the release-instant-in-time is immediately before the plunger moves from the retracted position towards the extended position.

17. The agricultural baler of claim 16, wherein the controller is configured to activate the one or more actuators to decrease the volume of the feeder duct at a compress-instant-in-time, wherein the compress-instant-in-time is immediately before the release-instant-in-time.

18. The agricultural baler of claim 16, wherein the controller is configured to activate the one or more actuators to decrease the volume of the feeder duct at a compress-instant-in-time, wherein the compress-instant-in-time is immediately before the release-instant-in-time.

19. A method for operating an agricultural baler, the baler comprising:
a bale chamber for the compression of crop material into bales, the bale chamber having a floor, a ceiling, a first wall and a second wall, wherein a bale forming direction of the bale chamber extends from an inlet end to an outlet end of the bale chamber, and wherein the floor comprises an inlet opening;
a plunger for forcing the crop material from the inlet end of the bale chamber towards the outlet end of the bale chamber;
a feeder duct communicating with the bale chamber through the inlet opening for charges of crop material to be transferred from the feeder duct into the bale chamber, wherein the feeder duct has an upper end facing upwardly and communicating with the inlet opening in the bale chamber and a lower end facing in a forward direction, the feeder duct has a top wall and a bottom wall extending between the lower end and the upper end of the feeder duct; and
one or more actuators that are configured to move the top wall or the bottom wall,
wherein the method comprises activating the one or more actuators during a baling operation in order to adjust the volume of the feeder duct by moving at least one of the top wall and the bottom wall to create one at least three configurations, a selected one of the configurations being activated by a controller by moving at least one of the top wall and the bottom wall to create one of a funnel-configuration, a reverse-funnel-configuration and a parallel configuration between the top wall and the bottom wall as the actuators move the top wall and/or the bottom wall during the baling operation.

* * * * *